UNITED STATES PATENT OFFICE.

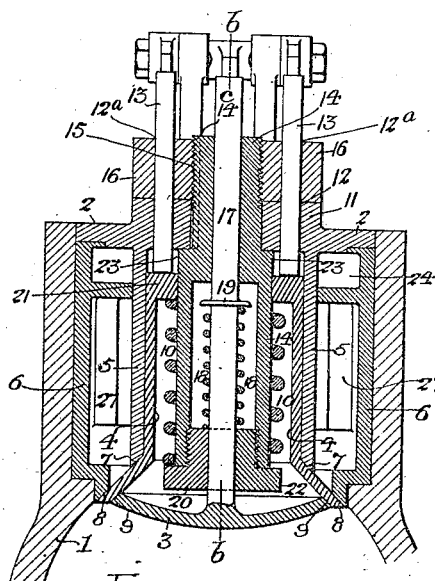

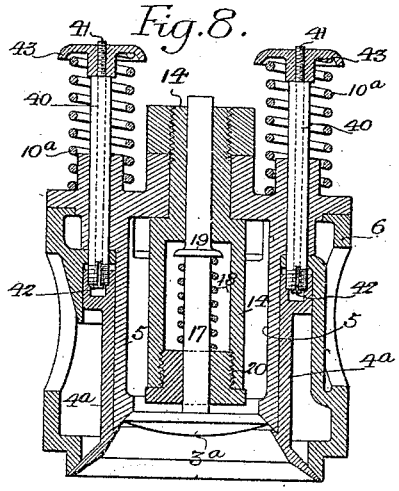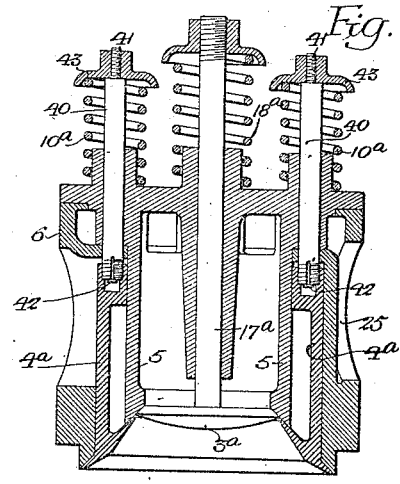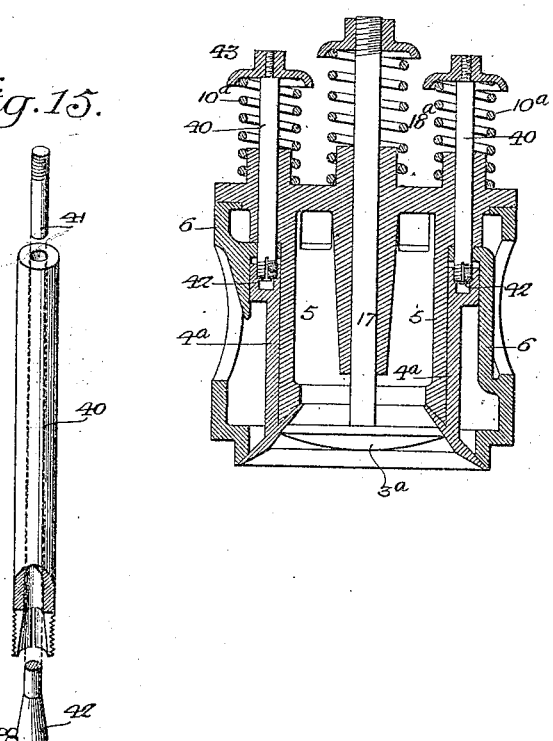

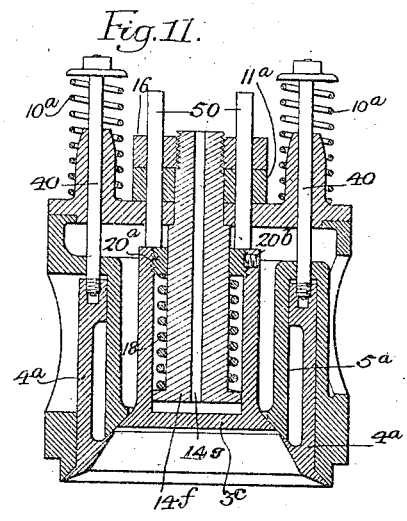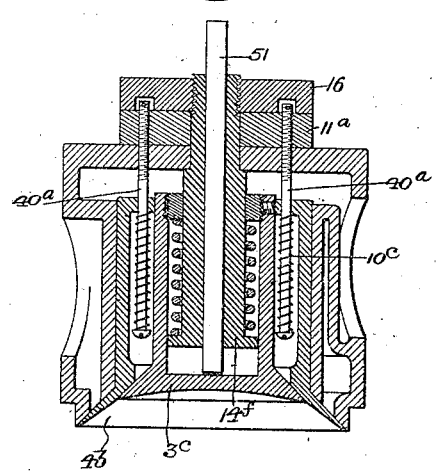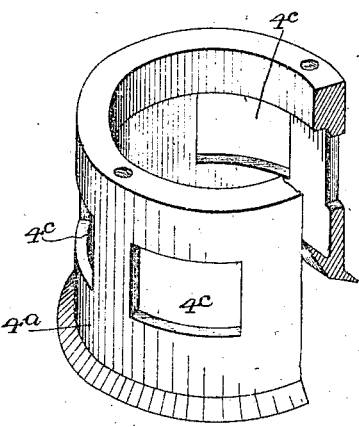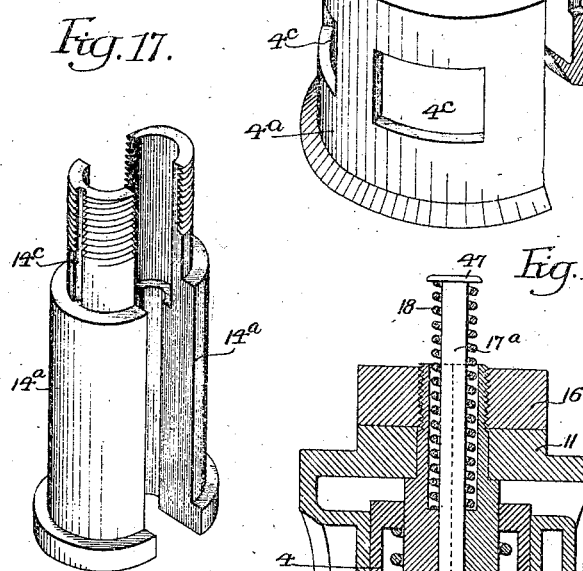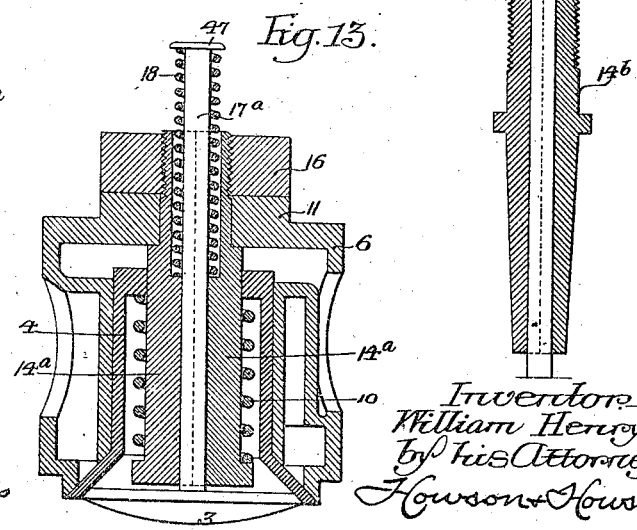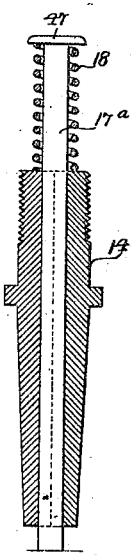

WILLIAM HENRY, OF PHILADELPHIA, PENNSYLVANIA.

VALVE FOR INTERNAL-COMBUSTION ENGINES.

1,034,708.    Specification of Letters Patent.    Patented Aug. 6, 1912.

Application filed September 18, 1907. Serial No. 393,474.

*To all whom it may concern:*

Be it known that I, WILLIAM HENRY, a citizen of the United States, residing in Philadelphia, Pennsylvania, have invented certain Improvements in Valves for Internal-Combustion Engines, of which the following is a specification.

One object of my invention is to provide a simple, compact, reliable and durable valve structure, in which the inlet and exhaust valves are arranged for combined operation in connection with internal combustion engines or other motors of a similar character.

A further feature of my invention is the arrangement of the inlet valve in such a manner that it will not only deliver a clean charge of explosive mixture to the engine cylinder without danger of the same being fouled by the exhaust, but will also cool the parts which might otherwise become unduly heated.

My improved structure can be made light in weight as there is no danger of the valves being warped by the heat, and it may be noted that a valuable feature of this construction is the fact that when light weight valves are used, there is little or no danger of the valve stems or shanks breaking so as to drop the valves into the cylinder.

Another object of the invention is to provide a more secure construction for the mounting of the valves than that hitherto employed.

My invention is fully shown in the accompanying drawings, in which,

Figure 1, is a sectional elevation of my improved valve structure, taken on the line *a—a*, Fig. 2; Fig. 2, is a sectional elevation of my improved valve structure, taken on the line *b—b*, Fig. 1; Figs. 3 and 4, are respectively a sectional perspective view and a plan view of the structure shown in Figs. 1 and 2; Figs. 5 and 6, are respectively sectional plans, taken on the lines *c—c*, and *d—d*, Fig. 2; Fig. 7, is a perspective view of one form of lever mechanism for operating the valves; Figs. 8 to 13 inclusive, are sectional views illustrating modified forms of valve structures embodying my invention; Figs. 14 and 15, are perspective views illustrating details of my invention; Fig. 16, is a fragmentary perspective view of one of the valves used in that form of my invention shown in Figs. 9 and 11; Fig. 17, is a detached perspective of a modified form of guide used in connection with the valve stem 17 and its associated parts; and Fig. 18, is a vertical section of a slightly modified form of guide.

In the drawings, 1 represents the cylinder of an engine, at the top of which is mounted and properly secured a shell or casing 2, forming a valve cage. This cage has mounted in it an inlet valve 3 and an exhaust valve 4, and is provided with an internal wall or sleeve 5, as well as with an annular wall 6. With this construction said walls provide seats 7 and 8 for the exhaust valve, and this in turn provides a seat 9 on its inner wall for the inlet valve 3.

The valve 3 controls the inlet of the explosive mixture, while the valve 4 controls the exhaust of the burned and waste gases. The valve 3 is in the present instance of the ordinary mushroom construction, while the valve 4 is in the form of a sleeve or cylinder, disposed within and adjacent to the inner wall of the casing, being supported in a normally raised position by means of a spring 10.

In the present instance the valve cage is made in two pieces, one providing an internal wall or sleeve 5, and the other an annular wall 6. The top of the section having the sleeve 5 is provided with a hub 11 having apertures 12 for the passage of the operating pins 13 which engage the valve 4. Centrally disposed with respect to the valve 4 and sleeve 5, is a tubular guide 14 having a threaded portion 15 engaged by a nut 16 upon the hub 11 and provided with apertures 12ª registering with the apertures 12 of said hub. This guide is centrally bored for the passage of the stem 17 of the valve 3, and its lower portion is hollow for the reception of a spring 18 interposed between a shoulder 19 on said stem 17 and a split nut 20 which is threaded into the inner wall of the lower end of said guide 14. The spring 10 supporting the valve 4 lies between the top wall 21 of said valve and an external flange 22 of the split nut 20.

The wall 5 of the valve cage is apertured at 23 for communication with a space 24 surrounding it and into which the inlet port 25 opens, as shown in Figs. 5 and 6. The top wall of the valve 4 is also apertured at 26 to permit of the passage of the inlet charge from the apertures 23 in the wall 5, so that said charge will fill the interior of the valve 4. The space between the walls 5 and 6, indicated at 27, is for the burned and waste gases of the exhaust and communicates directly with an exhaust port 28, being controlled by the valve 4 seating against said walls 5 and 6.

The valves are operated mechanically, preferably by the means shown in Figs. 1, 2 and 7, and the mechanism is so arranged that when one valve is opened the other closes, and vice versa. Carried by the bracket 30, which may be mounted on any suitable supporting structure, are a pair of levers 31 having their inner ends 32 engaging the pins 13 and their outer ends connected to a pin 33 carried by a rod 34 which is operated (i. e., raised and lowered) by suitable means. Carried also by this rod and bearing a fixed relation thereto, is an arm 35, the end 36 of which engages the valve stem 17. When the rod 34 is raised, therefore, the inner ends of the levers 31 will be depressed, opening the valve 4, which controls the exhaust, and with it lowering the valve 3, while when said rod 34 is lowered, the valve 4 will be closed by its spring 10 and the arm 35 will carry down with it the stem 17 so as to open the valve 3. The springs 10 and 18 serve to return the valves to their closed positions when such movement is permitted by the rod 34.

The valves 3ª and 4ª shown in Figs. 8 and 9, operate in substantially the same manner as those shown in Figs. 1, 2 et seq. In these structures, however, the valve 3ª seats against the inner wall 5, instead of against the valve 4ª, while this latter valve 4ª is carried by tubular stems 40 threaded into it and held against removal by internal pins 41 having tapered heads 42 which lie within the threaded portions of said stems as shown in Fig. 15. These threaded portions are split and said heads tend to hold them in engagement with the threaded recesses in the valve 4ª. The outer ends of the pins 41 are threaded and have heads 43, being turned down so as to engage the tubular stems 40. Between these heads and the top of the valve cage springs 10ª are provided to keep the valve 4ª normally closed.

In the structure of Fig. 8, the valve 3ª is mounted in substantially the same manner as shown in Figs. 1 and 2, while in Fig. 9, the valve 3ª is carried by a spring 18ª externally supported and disposed between a head carried by the stem 17ª and the top of the valve casing.

With the peculiar arrangement of the valves and valve cage shown in Fig. 9, it is obvious that there must be openings in the valve 4ª in order to permit of the flow of gases through said valve when this is in its open position, and in Fig. 16, I have shown my preferred arrangement of these openings at 4ᶜ, though it will, however, be understood that if desired, the valve faces may be arranged in the manner illustrated in any of the figures of the present case.

In the structure shown in Fig. 10, the valve 4ª has its face extended inwardly at an angle, and the valve 3ª engages it, the valves being supported in this structure in the manner shown in Fig. 9.

It will be noted that in Figs. 8 and 10 I have so constructed the cage that there is an annular recess formed between its inner and outer walls into which projects the enlarged upper end of the valve 4ª. Said end fits into said recess in such manner as to provide an additional barrier for preventing the possible leakage of the gases from the exhaust around said valve 4ª, for it will be seen that before such leakage is possible the gases would be compelled to pass between the valve and two relatively elongated wall surfaces.

In all instances it will be noted that one of the valves has a plurality of seats, and while these seats are shown as being disposed at an angle, it will be understood that I do not wish to limit myself to this exact construction.

Although I have shown the valve casing as made in two pieces, it will be understood that it may be made in one piece without departing from my invention.

The nut 20 is split in order to permit of its being fitted into place, as I prefer to have an integral shoulder for the valve stem 17, rather than one formed by a nut or collar threaded on said stem.

If desired, in place of employing the split nut 20 illustrated in Fig. 14, I may construct the guide 14 as illustrated at 14ª in Figs. 17 and 18, that is to say, I may make it in two parts, separating on a plane parallel to the general line of the valve stem 17ª, Fig. 13, but otherwise serving the functions of the guide and split nut shown in Figs. 1 to 3. In this case, however, I preferably place the spring 18 between a head or collar 47 on the stem 17ª and the said guide, recessing the latter as in Figs. 13 and 17, in order to shorten and lighten the construction as much as possible. Where these latter features are not of importance, the spring 18 may be allowed to project entirely above the end of the guide, which may in such instances be constructed as indicated at 14ᵇ, Fig. 18, while the construction of the remainder of the device would be that shown in Fig. 9.

It is obvious that the general shape of the valve cage, as well as the forms of the valves and passages, may be designed to suit the various conditions required in operation so as to permit the gases to flow to and from the cylinder in a manner such as will secure the highest efficiency.

In order to facilitate the assembling of the parts in that form of my invention illustrated in Figs. 1, 2, 3 et seq., I may provide a longitudinally extending slot 14ᶜ in the upper end of the guide structure 14, and place a screw 14ᵈ, as shown in Figs. 3 and 4, in the upper portion of the valve cage structure 11, so that its inner end will enter said groove or slot and prevent relative movement of the guide and cage while the nut 16 is being operated to draw the parts together.

In order to insure that the nut 20 shall remain permanently screwed within the lower end of the guide 14, I fasten it in place by means of a small set screw 14ᵉ as shown in Fig. 2.

Among the advantages of the construction of valves above described may be noted the possibility of reversing the functions of the various parts in case this should be desired for any reason:—that is to say, the valve 3, instead of being the inlet valve, may be made to perform the functions of the exhaust valve, while the valve 4, with its various openings and associated structures, would, under the same conditions, similarly serve as the means for controlling the inlet of gases to the cylinder. It will be further noted that when the valve 3 is opened, there is but a single spring opposing its movement and tending to close it, while when the valve is opened, its operation is opposed, not only by the spring 10, or, in the case of the mechanism shown in Figs. 8 and 9, by two springs 10ᵃ, but also by the spring 18, which acts through the medium of the valve 3 or 3ᵃ, and tends to re-seat it, when this is permitted by the operating rod 34.

In that form of my invention shown in Fig. 11, the inner of the two valves, indicated at 3ᶜ, is of the sleeve type, and instead of seating against the outer valve 4ᵃ, as in the case of the valve illustrated in Fig. 9, it seats against a portion of the wall 5ᵃ of the cage. In such case the inner valve is operated by rods or pins 50 and has within it a single-piece guide structure 14ᶠ, having a flange at one end and provided with an internal passage 14ᵍ, whereby suitable fluid, such as air or a liquid, may be introduced into the interior of the valve 3ᶜ for the purpose of cooling the parts. The spring 18 for closing this valve is confined between the flange of the guide and a nut 20ᵃ screwed into the upper end of the valve and held in position by means of a set screw 20ᵇ. The outer valve 4ᵃ in this case, as in that illustrated in Fig. 9, seats both upon the outer wall of the cage and upon the inner wall 5ᵃ thereof, and has springs 10ᵃ operative upon pins or rods 40 for normally maintaining it in a closed position.

In the case of the construction illustrated in Fig. 12, the internal valve 3ᶜ is so constructed as to seat upon the outer valve 4ᵇ and is designed to be actuated by means of a single rod 51 passing into engagement with the interior of its head through a suitable channel in the guide 14ᶠ. The construction may, if desired, be that illustrated in Fig. 11, where two pins 50 are employed. The valve 4ᵇ in this instance is held in and returned to its closed position by means of springs 10ᶜ operative on rods 40ᵃ threaded into the part 11ᵃ of the valve cage, which part in the case of Figs. 11 and 12, is in the form of a washer independent of said cage, though it is the full equivalent of the part 11 shown in Figs. 2 and 3. If desired the valves 3ᶜ and 4ᵇ of Fig. 12, may be supported and operated by the means shown in Figs. 8, 9, 10, 11 and 15, without departing from my invention. The springs 10ᶜ are confined in the space between the valves 3ᶜ and 4ᵇ, being retained on the pins or bolts 40ᵃ between the heads thereof and the inwardly flanged end of the valve 4ᵇ or a suitable nut therein. The valve, as illustrated in Fig. 16, is provided with openings 4ᵉ in its sides to permit of the passage of gases through it, and may be operated by any of the devices shown in Figs. 1, 2, et al.

As above noted, in Fig. 13, I have shown valves of the general arrangement and construction illustrated in Figs. 1 and 2, but with a spring 18 placed in a recess on the upper portion of the split guide 14ᵃ.

I claim:—

1. The combination in a valve structure of a casing having ports and provided with a pair of concentric valves; means for holding said valves to their seats; two stems operatively connected to one valve; a third stem between said two stems and operatively connected to the other valve; a pair of levers engaging the two stems of the first valve; an arm operative on the stem of the other valve; a member rigidly connected to the arm and rotatably connected to the levers; and a reciprocable bar connected to the member so as to cause opening of one of the valves when moved in one direction and opening of the other valve when moved in the opposite direction.

2. The combination in a valve structure of a pair of movable valves; means for holding said valves to their seats; stems operatively engaging said valves for actuating the same; a lever having an arm operative on one of said stems; an actuating rod pivotally connected to said lever for moving the same; with an arm rigidly connected to said rod and operative on the other valve stem.

3. The combination in a valve structure of a cage having an outer wall provided with ports; an inner cylindrical wall and a central hollow guide structure; a sleeve valve mounted within the inner of said cage walls and provided with a flange capable of seating simultaneously upon the end of said wall and also upon the outer cage wall; a valve stem slidable through said guide; a valve on said stem capable of seating against the first valve; a spring within the hollow guide operative on said valve stem; and a second spring mounted on the outside of the guide and operative on the first valve.

4. The combination in a valve structure of a cage having outer walls provided with ports, an inner wall and a centrally placed hollow cylindrical guide; a sleeve valve guided by said inner wall and capable of simultaneously seating on said wall and on the outer wall of the cage; a movable plug forming one end of the hollow guide; a valve stem slidable through said guide and said plug; a valve mounted on said stem and capable of seating against the sleeve valve; a spring within the hollow guide normally tending to keep the second valve in its closed position, and a second spring mounted between the guide and the sleeve valve so as to tend to maintain the latter in a closed position.

5. The combination in a valve structure of a cage having inner and outer walls spaced apart and provided with a hollow central guide; a sleeve valve guided by the inner cage wall and flared to seat thereon and also on the outer wall; a valve stem slidable within the guide; a valve on said stem placed to seat upon the flared portion of the sleeve valve; and a spring within the hollow guide operative on said stem.

6. The combination in a valve structure of a cage having inner and outer walls and a central hollow guide; a plug removably closing one end of said guide; a sleeve valve mounted to guided by the inner cage wall; a stem slidable through the guide and the plug thereon; a valve on said stem coacting with the first valve; and a spring within the guide operative on said valve stem.

In testimony whereof, I have signed my name to this specification, in the presence of two subscribing witnesses.

WILLIAM HENRY.

Witnesses:
  WILLIAM E. BRADLEY,
  JOS. H. KLEIN.